US009145839B1

(12) United States Patent
Andrasko

(10) Patent No.: US 9,145,839 B1
(45) Date of Patent: Sep. 29, 2015

(54) SYSTEMS AND METHODS FOR CONTROLLING ACCELERATION OF A VEHICLE HAVING AN INTERNAL COMBUSTION ENGINE

(71) Applicant: Brunswick Corporation, Lake Forest, IL (US)

(72) Inventor: Steven J. Andrasko, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 27 days.

(21) Appl. No.: 14/104,291

(22) Filed: Dec. 12, 2013

Related U.S. Application Data

(60) Provisional application No. 61/783,242, filed on Mar. 14, 2013.

(51) Int. Cl.

| | |
|---|---|
| ***B60L 3/00*** | (2006.01) |
| ***B60L 15/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |
| ***F02D 29/02*** | (2006.01) |

(52) U.S. Cl.
CPC .................................... *F02D 29/02* (2013.01)

(58) Field of Classification Search
CPC .... G05D 1/0206; B63H 21/213; B63H 21/22; B63H 25/42; B63B 49/00
USPC ........................................................ 701/21
See application file for complete search history.

(56) References Cited

U.S. PATENT DOCUMENTS 4,601,270 A * 7/1986 Kimberley et al. ........... 123/357
7,214,110 B1 * 5/2007 Ehlers et al. ...................... 440/1
7,481,200 B2 1/2009 Uplap et al.

OTHER PUBLICATIONS

2013 Grand Am Rolex Series MS15.X V1.03 GA Software Information for Diesel Applications, Release 1.0, Motorsport Bosch, Roles MS4.3 Integration, May 29, 2013, 5 pgs.

* cited by examiner

*Primary Examiner* — Maceeh Anwari
(74) *Attorney, Agent, or Firm* — Andrus Intellectual Property Law, LLP

(57) ABSTRACT

A method for controlling acceleration of a vehicle having an internal combustion engine includes determining a first demand limit based on a smoke limit of the engine; determining a second demand limit based on a user-selected acceleration profile; retrieving a previous demand limit from a memory; and determining a third demand limit by adding a predetermined step quantity to the previous demand limit. The method further includes outputting the lesser of the first demand limit, the second demand limit, and the third demand limit as a subsequent demand limit. The method further includes controlling the engine with a control circuit to achieve the subsequent demand limit such that the vehicle accelerates from a speed associated with the previous demand limit to a speed associated with the subsequent demand limit.

20 Claims, 6 Drawing Sheets

| LEVEL | RATE (Δ% DEMAND/SEC) | % OVERSHOOT | DURATION (SECONDS) |
|---|---|---|---|
| 1 | 9.5 | 0 | 0 |
| 2 | 15 | 5 | 2.5 |
| 3 | 45 | 10 | 3.0 |
| 4 | 95 | 15 | 3.5 |
| 5 | 200 | 20 | 4.0 |

SYSTEMS AND METHODS FOR CONTROLLING ACCELERATION OF A VEHICLE HAVING AN INTERNAL COMBUSTION ENGINE

CROSS-REFERENCE TO RELATED APPLICATION

This application claims the benefit of U.S. Provisional Application No. 61/783,242, filed Mar. 14, 2013, which is hereby incorporated by reference in its entirety.

FIELD

The present disclosure relates to systems and methods for controlling acceleration of vehicles having internal combustion engines. Specifically, the present disclosure relates to systems and methods for controlling the aggressiveness of acceleration, or launch, of the vehicle.

BACKGROUND

U.S. Pat. No. 7,214,110 discloses an acceleration control system which allows an operator of a vehicle to select an acceleration profile to control the engine speed of a vehicle from an initial starting speed to a final desired speed. When used in conjunction with tow sports, such as wake boarding and water skiing, the use of an acceleration profile provides consistent performance during the period of time when a water skier is accelerated from a stationary position to a full speed condition.

U.S. Pat. No. 4,601,270 discloses a method and apparatus for controlling the torque or fuel quantity limit to an internal combustion engine such as a diesel engine, at least partly as a function of the sensed level of smoke in the exhaust gas stream of the engine. An open-loop preliminary fuel quantity limit signal is provided as a function of engine speed. The actual smoke level is compared with a smoke limit value for the particular operating condition, and an error signal indicates the sense and possibly the magnitude of any difference. The error signal is the basis of a compensating signal which is added to the open-loop preliminary fuel quantity limit signal such that the resulting fuel quantity limit signal provides for maximum torque without exceeding the smoke limit. The smoke level is obtained by a direct measurement of the particulate level or the like in the exhaust gas stream. An alarm may be provided for indicating when the actual smoke level exceeds some threshold relative to the smoke limit.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method for controlling acceleration of a vehicle having an internal combustion engine comprises determining a first demand limit based on a smoke limit of the engine, determining a second demand limit based on a user-selected acceleration profile, retrieving a previous demand limit from a memory, and determining a third demand limit by adding a predetermined step quantity to the previous demand limit. The method further comprises outputting the lesser of the first demand limit, the second limit, and the third demand limit as a subsequent demand limit. The method further comprises controlling the engine with a control circuit to achieve the subsequent demand limit such that the vehicle accelerates from a speed associated with the previous demand limit to a speed associated with the subsequent demand limit.

According to another example of the present disclosure, a system for controlling acceleration of a vehicle comprises a propulsion device that provides a force to accelerate the vehicle and an internal combustion engine connected in torque-transmitting relationship with the propulsion device. One or more fuel injectors provide fuel to the engine. A control circuit is connected to the one or more fuel injectors. The system further comprises a memory that stores a previous demand limit of the engine. The control circuit determines a first demand limit based on a smoke limit of the engine, determines a second demand limit based on a user-selected acceleration profile, and determines a third demand limit by adding a predetermined step quantity to the previous demand limit. The control circuit sets the lesser of the first demand limit, the second demand limit, and the third demand limit as a subsequent demand limit. The control circuit sends control signals to the one or more fuel injectors so as to provide a quantity of fuel that will achieve the subsequent demand limit.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
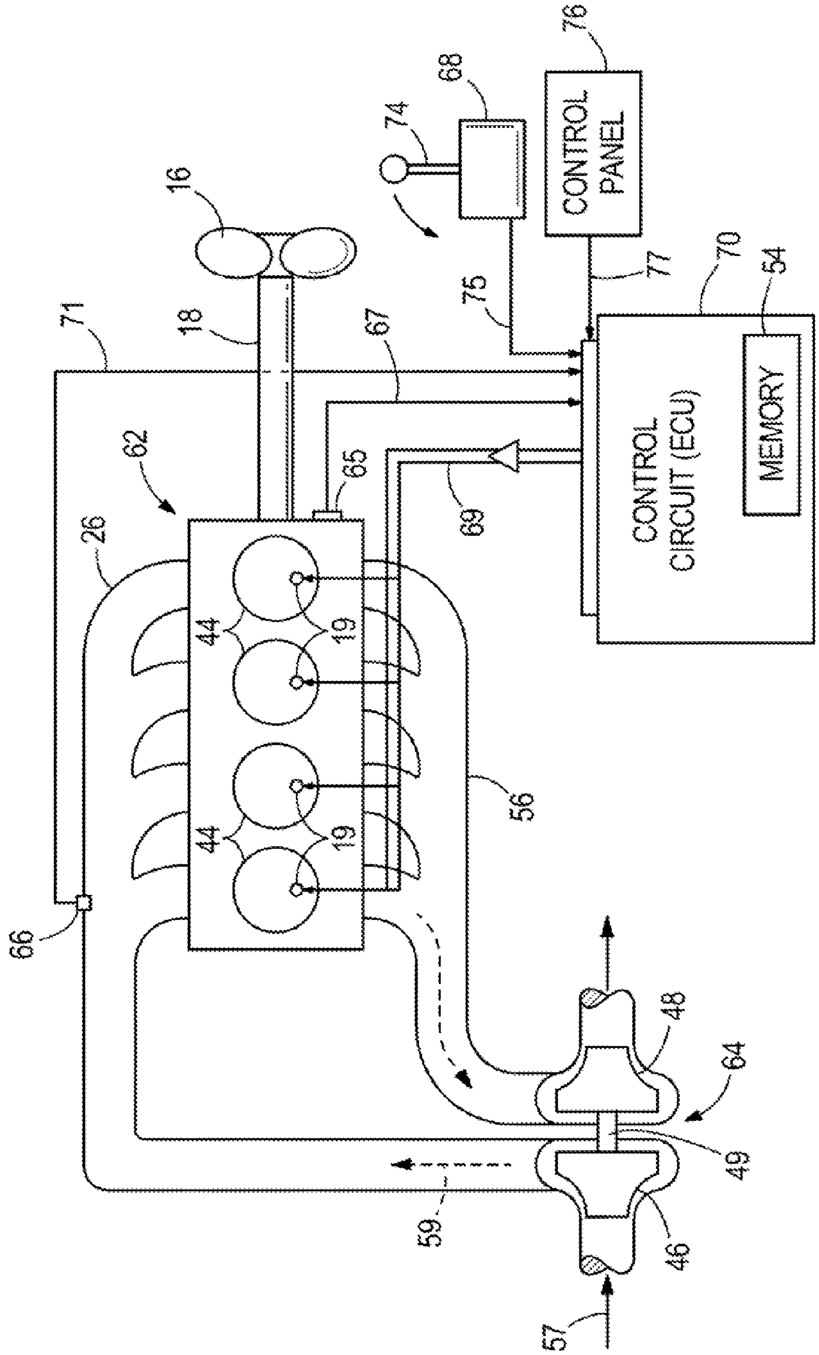
FIG. 1 is a schematic representation of various components of a vehicle according to the present disclosure.

FIG. 1 is a schematic representation of various components of a vehicle according to one example of the present disclosure. In the example shown, the vehicle is a marine vessel, but the systems and methods described herein apply equally to any vehicle driven by an internal combustion engine. The vehicle comprises a propulsion device 16, such as for example a propeller, that provides a force to accelerate the vehicle. The vehicle further comprises a diesel internal combustion engine 62 connected in torque transmitting relationship, for example via shaft 18, with the propulsion device 16. The engine 62 has an intake manifold 26 and an exhaust manifold 56. The engine 62 further comprises one or more fuel injectors 19 that provide fuel to combustion chambers 44 of the engine 62, which fuel is mixed with air from the intake manifold 26.

A control circuit 70 is connected to the one or more fuel injectors 19 via lines 69. The control circuit 70, which can be for example an engine control unit (ECU), controls the operating speed of the engine 62 in conformance with signals received from the position of a control lever 74 of an operator-controlled device 68. For example, the operator-controlled device 68 allows the operator of the vehicle to input a signal to request acceleration of the vehicle from a first speed to a second speed. Because the speed of the vehicle is related to the quantity of fuel provided to the engine 62, effectively, movement of the control lever 74 inputs a fuel quantity demand via line 75 to the control circuit 70. Generally, the control circuit 70 then controls the fuel injectors 19 via lines 69 so as to provide the fuel quantity that was demanded. However, as will be described further herein below, the control circuit 70 may alternatively limit the fuel quantity actually injected by the fuel injectors 19 so as to smoothly accelerate the vehicle at a desired level of aggressiveness.

It should be understood that fuel flow in a diesel engine is determinative of a corresponding torque of the engine. Therefore, the fuel quantity demand input via the control lever 74 over line 75 is effectively a torque demand. Further, any limit that the control circuit 70 places on the fuel quantity actually injected is effectively a torque limit. Both the fuel quantity limit and the torque limit will be described herein below as a "demand limit," so as to indicate that the control circuit 70 may be programmed to operate in terms of either or both parameters.

The control circuit 70 includes a memory 54 and a programmable processor. As is conventional, the processor can be communicatively connected to a computer readable medium that includes volatile or nonvolatile memory upon which computer readable code (software) is stored. The processor can access the computer readable code on the computer readable medium, and upon executing the code can send signals to carry out functions according to the methods described herein below. For example, execution of the code allows the control circuit 70 to control a plurality of actuators (such as for example the fuel injectors 19) on the engine 62 according to the methods described below. The control circuit 70 can be connected to the actuators with which it communicates via wireless communication or by a serially wired CAN bus. It should be noted that the lines shown in FIG. 1 are meant to show only that various devices are capable of communicating with the control circuit 70, and do not necessarily represent actual wiring connecting the devices, nor do they represent the only paths of communication between the devices. Further, it should be understood that the control circuit 70 could additionally or alternatively comprise many different electronic control units, such as, for example, a system interface module, at various locations aboard the vehicle, and need not be contained within one engine control unit (ECU) as shown herein.

One consideration to take into account when accelerating a diesel engine is its smoke limit. The smoke limit is a calibratable demand limit (usually determined from a look-up table stored in the memory 54) that if exceeded causes the diesel engine to smoke. A diesel engine may be smoke limited during acceleration of the vehicle, whereby the control circuit 70 limits the quantity of fuel actually injected by the fuel injectors 19 to give no less than a calibratable minimum air to fuel ratio based on measured or modeled air flow into the engine 62. The air flow can be measured with a mass air flow sensor 66 provided in the intake manifold 26, or can be modeled based on other known engine parameters as is known to those having ordinary skill in the art. Measured engine speed (input from a speed sensor 65) and measured or modeled air flow are provided as inputs to the look-up table, which uses these values to output a smoke limit. If the smoke limit is exceeded, the air-fuel mixture in the combustion chambers 44 of the engine 62 will be too rich and not all of the fuel will be able to be combusted, which will cause the fuel to burn and smoke.

The engine 62 shown herein includes a turbocharger 64. The turbocharger 64 uses a portion of exhaust gas energy to increase the pressure of air delivered to the combustion chambers 44. The pressurized air can be burned with a larger quantity of fuel, thereby resulting in increased power and torque as compared to naturally aspirated engines. The turbocharger 64 comprises a compressor 46 and a turbine 48 coupled by a common shaft 49. Exhaust gas from the exhaust manifold 56 drives the turbine 48, which drives the compressor 46 via the shaft 49. The compressor 46 in turn compresses ambient air that enters the system as shown at arrow 57. The compressed air is then directed into the intake manifold 26, as shown by arrow 59, and eventually to the combustion chambers 44.

The boost that the turbocharger 64 is able to provide depends on the speed of the engine 62 and turbine power. There is a time lag after start-up of the engine 62 before the turbocharger 64 is able to provide adequate air flow to the engine 62. This lag occurs because the turbocharger 64 relies on the buildup of exhaust gas pressure to spin the turbine 48 and hence the compressor 46. In variable output systems, exhaust gas pressure at idle or lower engine speeds may be insufficient to drive the turbine 48. When the engine 62 reaches sufficient speed, the turbine 48 starts to spool up, or spin fast enough to produce boost. However, the turbine 48 lags behind the increase in engine speed as the turbine 48 responds to the increase in exhaust gas pressure.

The speed of the engine 62 is in turn a function of fueling rate, which as described above, is smoke limited. Therefore, the rate of increase of allowed fueling is a function of any variable that can affect the rate of change of engine speed, such as vehicle load, towed load, engine start speed, or propeller geometry. For example, as the turbocharger 64 spools up, the smoke limit disappears due to increased air flow provided by the turbocharger 64, and a nearly vertical increase in engine fueling/torque capability (i.e., in the demand limit) results. As the engine 62 transitions from the smoke limited demand limit to the un-smoke limited demand limit, a torque "bump" results, which can be felt by the operator of the vehicle.

It should be understood by those having ordinary skill in the art that the vehicle could alternatively or additionally be provided with a supercharger that is driven by a mechanical connection to the shaft 18 of the engine 62 and still fall within the scope of the present disclosure. For example, the same discussion regarding a smoke limit applies equally to a vehicle provided with a supercharger as it does to one provided with a turbocharger 64 as shown in FIG. 1.

Also shown in FIG. 1 is a control panel 76 that allows the operator of the vehicle, in certain examples of the present disclosure, to provide additional information to the control circuit 70 via line 77. For example, the control panel 76 allows the operator of the vehicle to select an acceleration profile, typically from a portfolio of potential profiles stored in the memory 54, and provide that selection to the control circuit 70 for future application when a start command signal is received. A start command signal may be received by the control circuit 70 from the operator-controlled device 68. This start command signal can be initiated by a sudden movement of the control lever 74, as indicated by the arrow, from a neutral position or idle position to a higher speed command with a relatively sudden movement of the control lever 74.

Figure 2:
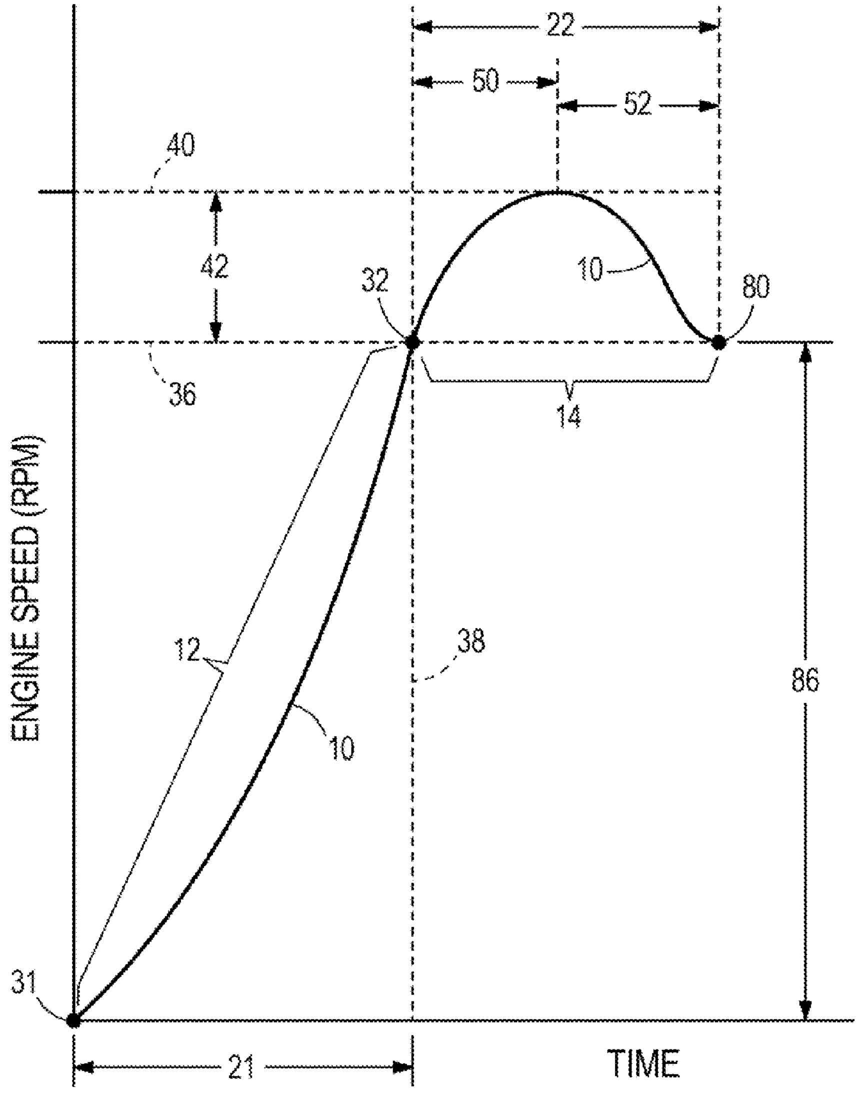
FIG. 2 is a graphical representation of one example of an acceleration profile for the vehicle.

FIG. 2 is a graphical representation of one example of an acceleration profile 10 for a vehicle. The acceleration profile 10, illustrated as engine speed as a function of time, comprises a first segment 12 and a second segment 14. The first segment 12 is associated with a first period of time 21 and the second segment 14 is associated with a second period of time 22. The first segment 12 of the acceleration profile 10 extends from an initial engine speed at point 31 to an engine speed at point 32 which is generally equal to a desired engine speed, or final engine speed, which is represented by dashed line 36. The second segment 14 of the acceleration profile 10 extends from that desired engine speed, at point 32, which occurs at the end of the first period of time 21 represented by dashed line 38, to a speed which is somewhat greater than the desired final engine speed 36. This greater engine speed is identified by dashed line 40 in FIG. 2. The greater speed 40 is of a greater magnitude than the desired final engine speed 36 by a preselected magnitude which is illustrated by arrow 42.

With continued reference to FIG. 2, it can be seen that the second segment 14 can comprise an acceleration portion, during the time period identified by arrow 50, and a deceleration portion, during the time period represented by arrow 52. Both the acceleration portion and the deceleration portion occur during the second period of time 22.

Several characteristics of acceleration of a vehicle according to one method of the present disclosure can be observed. For example, the first segment 12 of the acceleration profile 10, during the first time period 21, is generally constant. The graphical representation in FIG. 2 shows this first segment 12 as representing a slightly increasing acceleration rate as the engine speed changes from point 31 to point 32. However, this acceleration rate can be much more constant than is shown in FIG. 2. In other words, the first segment 12 of the acceleration profile 10 can be virtually a straight line extending between points 31 and 32. After the expiration of the first period of time 21, an overshoot condition may be intentionally provided. After achieving the desired final engine speed 36, at point 32, the engine speed is increased beyond that desired final engine speed 36 to achieve the overshoot represented by arrow 42. This results in the achievement of the speed represented by dashed line 40. This continued acceleration occurs in the time period identified by arrow 50. Then, according to a preselected procedure, the engine speed is decelerated during time period 52 to the desired final engine speed 36 which is achieved at point 80 in FIG. 2.

Figures 3, 4:
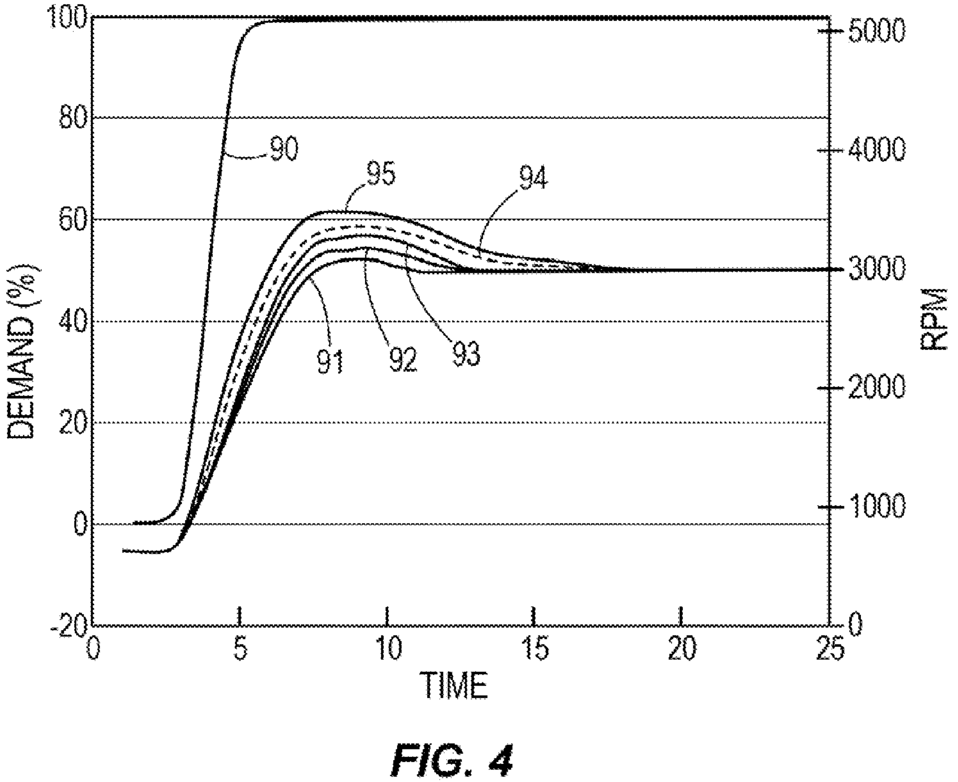
FIG. 3 is a table showing parameters used to describe various example acceleration profiles.
FIG. 4 is a graphical representation of a rate of movement of a control lever in combination with five example acceleration profiles.

The information relating to the acceleration profile, in one example of the present disclosure, is represented by three parameters for each of five potential acceleration profiles stored in the memory 54. The information is shown in FIG. 3. In the example table of FIG. 3, five levels are represented. For each level, the rate of acceleration, represented as Δ % Demand/sec, is stored along with an associated percentage overshoot magnitude. The percentage overshoot magnitude is equivalent to the percentage of the magnitude represented by arrow 42 in FIG. 2 to the magnitude represented by arrow 86 in FIG. 2. If the final desired speed is 3400 RPM, for example, the level three illustration in FIG. 3 would describe a 10% overshoot, or 340 RPM for three seconds, which would be the difference represented by arrow 42 in FIG. 2. In FIG. 3, the duration for each level is also stored. This duration represents the magnitude of the second period of time 14, measured in seconds, for each of the levels. During operation, the operator of the vehicle would select a level (e.g. 1-5) via the control panel 76 prior to providing the start signal by rapidly moving the control lever 74 from an initial speed position to a higher speed position.

FIG. 4 is a graphical representation of several example acceleration profiles. Line 90 represents the operator demand, or position of the control lever 74, with respect to the left axis as percentage of the maximum engine speed command. In addition, five acceleration profiles 91-95 are shown with respect to the right axis in FIG. 4. Each acceleration profile corresponds to a user-desired aggressiveness of acceleration of the vehicle.

As shown in FIG. 4, this particular example of the present disclosure responds to a rapid movement of the control lever 74, as represented by line 90, from a zero speed command to a demand greater than the demand needed to achieve a set point engine speed (in the example, 3,000 RPM) in a relatively short period of time. When this rapid movement of the control lever 74 is detected by the control circuit 70, one of the illustrated acceleration profiles 91-95 is followed. It should be understood that although five profiles are shown simultaneously in FIG. 4, only one profile would be applied during a given launch of the vehicle. That acceleration profile would typically have been previously selected from a choice of potential acceleration profiles by the operator of the vehicle, for example, by selection via the control panel 76. In FIG. 4, acceleration profile 91 conforms generally with the level one profile in FIG. 3, acceleration profile 92 in FIG. 4 conforms generally with the second level shown in FIG. 3, and so on.

As shown in FIG. 4, all five acceleration profiles 91-95 begin at the same initial engine speed and end at the same final set point engine speed (e.g. 3,000 RPM), but vary significantly in the acceleration rate of the first segment 12 and the overshoot of the second segment 14. Effectively, the acceleration profiles shown in FIG. 4 are the result of the control circuit 70 "filtering" the demand that was requested by the operator according to the example Table in FIG. 3. In this way, the control circuit 70 limits the fuel quantity actually injected by the fuel injectors 19 to a lesser value than that demanded by movement of the control lever 74, as represented by line 90.

As described with respect to FIGS. 1-4, the control circuit 70 of the engine 62 controls the fuel injected into the engine 62 in response to a movement of the control lever 74 in conjunction with a demand limit that is applied by selection of a certain acceleration profile via the control panel 76. Specifically, the control circuit 70 controls the fuel injectors 19 at each instant in time during the time period of the user-selected acceleration profile such that the fuel quantity actually injected by the fuel injectors 19 is limited to achieve acceleration according to the user-selected acceleration profile. In other words, the fuel quantity demand input via the control lever 74 is modified by the control circuit 70, which imposes a filtered demand limit on the system.

When the filtered demand limit imposed by the control circuit 70 according to the user-selected acceleration profile is greater than the smoke limit, the problem of a non-linear torque bump as described hereinabove occurs during acceleration of the vehicle. The methods described below eliminate this torque bump and hence any non-linear feel experienced by the operator of the vehicle during acceleration.

The present disclosure provides a method for accelerating a vehicle that incorporates both the concepts of a filtered demand limit and a smoke limit described herein above. According to the present systems and methods disclosed herein below, the control circuit 70 is programmed to output a demand limit that is based on one of the following: (1) the smoke limit, (2) the user-selected acceleration profile, or (3) a rate limit. In one example, the demand limit cannot be more than a calibratable amount greater than the current smoke limit. As the turbocharger 64 builds air flow and the smoke limit increases, the rate at which the demand limit increases is controlled in order to avoid a sharp step in a rate of fueling of the engine 62 (i.e., in order to avoid torque bump).

Figure 5:
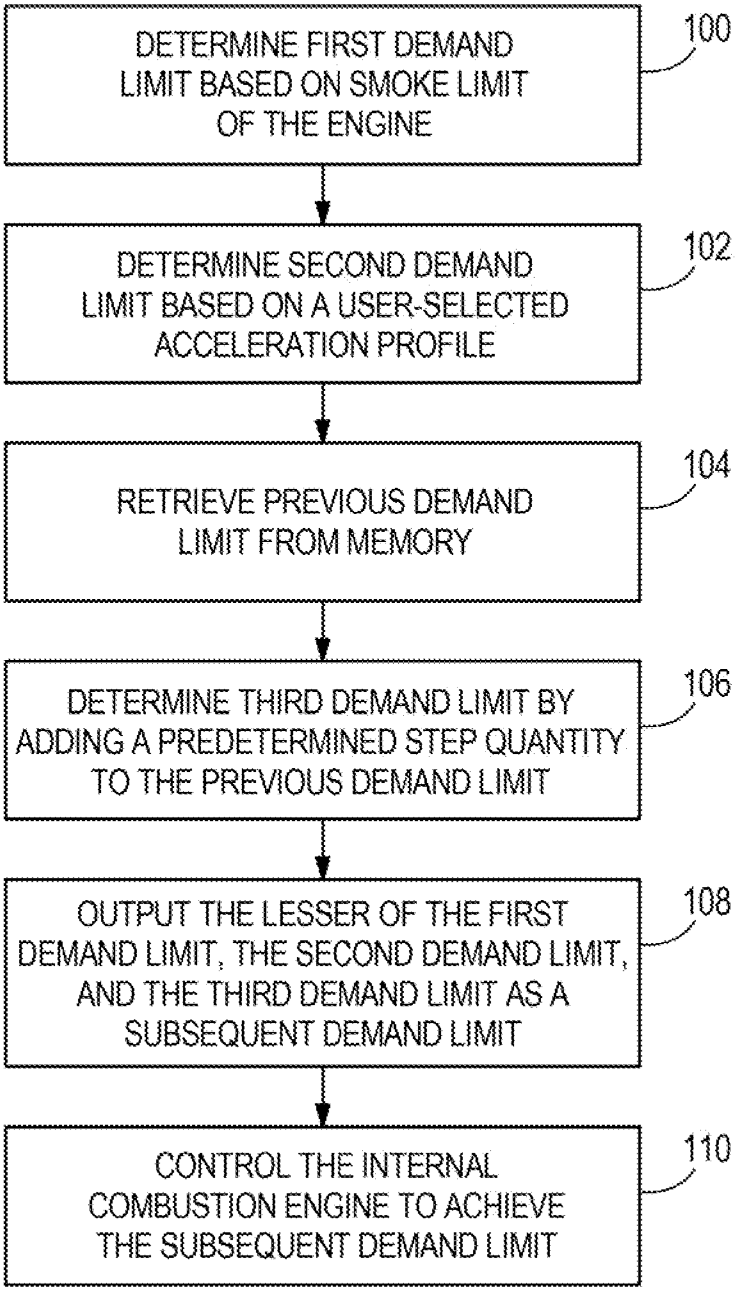
FIG. 5 depicts one example of a method for controlling acceleration of the vehicle.

Now referring to FIG. 5, a method for controlling acceleration of the vehicle is disclosed. As shown at box 100, the method includes determining a first demand limit based on a smoke limit of the engine. The smoke limit may be based on at least one operating condition of the engine 62. For example, the at least one operating condition may be mass air flow in an intake manifold 26 of the engine 62. As described above with reference to FIG. 1, the control circuit 70 may receive values from an engine speed sensor 65 via line 67 and the mass airflow sensor 66 via line 71, and may input these values into a look-up table stored in the memory 54 to determine the smoke limit. At least while the turbocharger 64 is building boost, the smoke limit at this time will be the same as the "percent load at current speed" feedback from the control circuit 70. The first demand limit is determined at preselected time intervals programmed into the control circuit 70.

Besides being measured directly with the mass air flow sensor 66 provided in the intake manifold 26, the mass air flow may be calculated based on measured conditions of the engine. As noted above, the at least one operating condition may additionally or alternatively be the speed of the engine, measured by speed sensor 65. One having ordinary skill in the art should understand that the smoke limit can be determined using operating conditions of the engine 62 other than these (such as, for example, intake manifold temperature) and still fall within the scope of the present disclosure.

In one example, the first demand limit is the smoke limit plus a predetermined offset quantity. The predetermined offset quantity accounts for any time lag in receipt of feedback from the engine 62 by the control circuit 70. In other words, the predetermined offset quantity saturates the demand limit in order to enhance engine acceleration. In one example, the predetermined offset quantity is a percentage of the smoke limit. For example, the predetermined offset quantity may be between about 1% to about 5% of the smoke limit. It should be understood that the first demand limit could alternatively be the smoke limit itself, with no predetermined offset quantity.

Returning to FIG. 5, the method further comprises determining a second demand limit based on a user-selected acceleration profile, as shown at box 102. The second demand limit may be determined as described hereinabove with reference to FIGS. 2-4. The acceleration profile may be selected by the user via the control panel 76. The control circuit 70 interprets the demand limit according to preselected time intervals at given points in time along the acceleration profile curve as a second demand limit for that point in time. The control circuit 70 determines the second demand limit in this manner at the same preselected time intervals at which the control circuit 70 determines the first demand limit.

The method may further comprise retrieving a previous demand limit from the memory 54, as shown at box 104, and determining a third demand limit by adding a predetermined step quantity to the previous demand limit, as shown at box 106. The predetermined step quantity in effect controls the rate at which the demand limit is permitted to increase, because, as shown at box 108, the method next includes outputting the lesser of the first demand limit, the second demand limit, and the third demand limit as a subsequent demand limit. The rate at which the demand limit increases is controlled because if the first demand limit and the second demand limit are greater than the previous demand limit plus the predetermined step quantity, the demand limit is increased only by the predetermined step quantity (i.e., the subsequent demand limit is equal to the previous demand limit plus the predetermined step quantity). Of course, if the first demand limit or second demand limit is less than the third demand limit, then no rate-limiting is applied, and instead the lesser of the first demand limit or the second demand limit is output as the subsequent demand limit.

In accordance with the user-selected acceleration profiles described hereinabove with respect to FIGS. 2-4, the predetermined step quantity may vary depending on the user-selected acceleration profile. For example, the predetermined step quantity may be greater (i.e., allow a greater rate of increase in the demand limit) when a level five profile is selected than when a level four profile is selected, and so on.

The method continues at box 110, and the engine 62 is controlled to achieve the subsequent demand limit such that the vehicle accelerates from a speed associated with the previous demand limit to a speed associated with the subsequent demand limit. As described herein above, it should be understood that the first demand limit, the second demand limit, and the third demand limit may be torque limits or fuel quantity limits in terms of how the control circuit 70 processes these values. In general, however, the control circuit 70 sends signals to the one or more fuel injectors 19 over lines 69 (FIG. 1) so as to provide the quantity of fuel to the engine 62 that will achieve the subsequent demand limit.

The method may further comprise storing the subsequent demand limit as the previous demand limit in the memory 54. This then completes one cycle of the method for whatever preselected time interval has been programmed into the control circuit 70. The method then repeats for the next time interval, and the control circuit 70 again determines whether the first demand limit, the second demand limit, or the newly stored previous demand limit plus the predetermined step quantity are to be used as the new subsequent demand limit. Of course, at this next time interval, the engine speed and the mass air flow have increased, and thus the smoke limit (and therefore the first demand limit) has also increased. At this next time interval, the second demand limit has increased as well, according to the acceleration profile curves shown in FIG. 4. The control circuit 70 uses these demand limits at this next time interval to once again output a new subsequent demand limit, the method proceeds to the next time interval, and so on.

Figure 6:
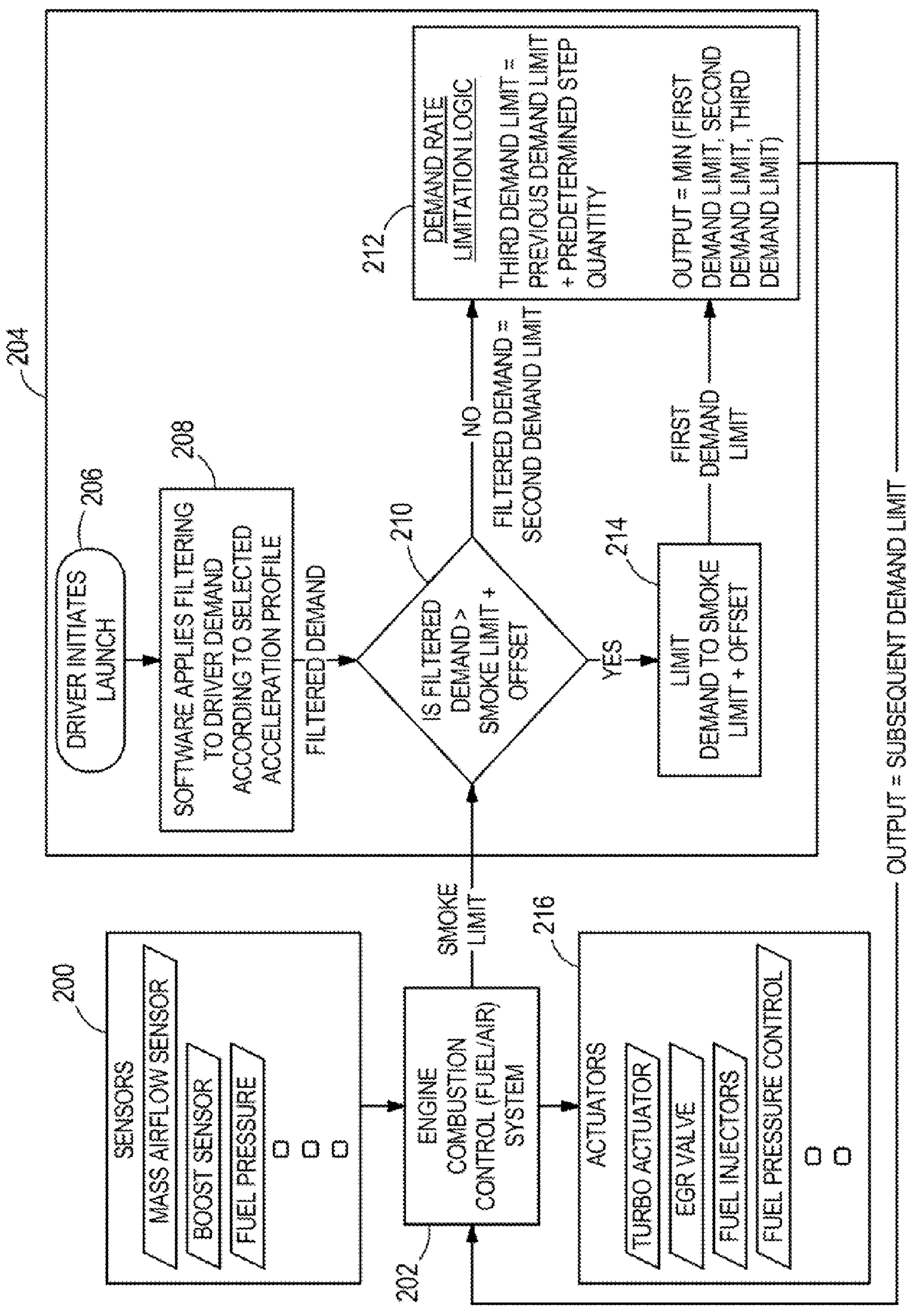
FIG. 6 depicts another example of a method for controlling acceleration of the vehicle.

Now referring to FIG. 6, the interplay between vehicle sensors and actuators and the software logic stored in the control circuit 70 will be described. At box 200, a plurality of sensors such as a mass air flow sensor, a boost sensor, and a fuel pressure sensor are represented schematically. These sensors provide information to an engine combustion control system shown at box 202. The engine combustion control system 202 may be a subsystem of the control circuit 70 of FIG. 1. Using information from the sensors in box 200, the engine combustion control system 202 provides the smoke limit to a logic circuit 204. The logic circuit 204 may also be a subsystem of the control circuit 70 of FIG. 1. It should be understood that the engine combustion control system 202 and the logic circuit 204 may be provided in the same or separate modules aboard the vehicle, such as, for example, in one or more system interface modules.

Meanwhile, the logic control circuit 204 receives a command from an operator of the vehicle to initiate launch, as shown at 206. The operator may select a desired acceleration profile for the vehicle via the control panel 76 and may initiate launch by sudden movement of the control lever 74 as described herein above with respect to FIG. 1. As shown at box 208, the software filters the driver's demand according to the acceleration profile that he or she has selected. The software outputs a filtered demand, as described hereinabove. As shown at box 210, the software determines whether the filtered demand is greater than the smoke limit plus the predetermined offset quantity. If no at box 210, the filtered demand value is provided as the second demand limit to box 212. If yes at box 210, the software limits the demand to the smoke limit plus the predetermined offset quantity, as shown at box 214. The smoke limit plus predetermined offset quantity is provided as the first demand limit to box 212.

At box 212, the software applies demand rate limitation logic. The software determines the third demand limit by adding a predetermined step quantity to a previous demand limit, as described herein above. The software then outputs the minimum of the first demand limit (in this example, the smoke limit plus the predetermined offset quantity), the second demand limit (in this example, the filtered demand), or the third demand limit (in this example, the previous demand limit plus the predetermined step quantity). The output is then sent as a subsequent demand limit to the engine combustion control system 202. The engine combustion control system 202 thereafter controls a plurality of actuators (shown schematically at box 216) associated with the engine 62 to provide the subsequent demand. The actuators are shown schematically at box 216 and include but are not limited to a turbo actuator, an exhaust gas recirculation valve, fuel injectors, and/or fuel pressure control systems.

Figure 7:
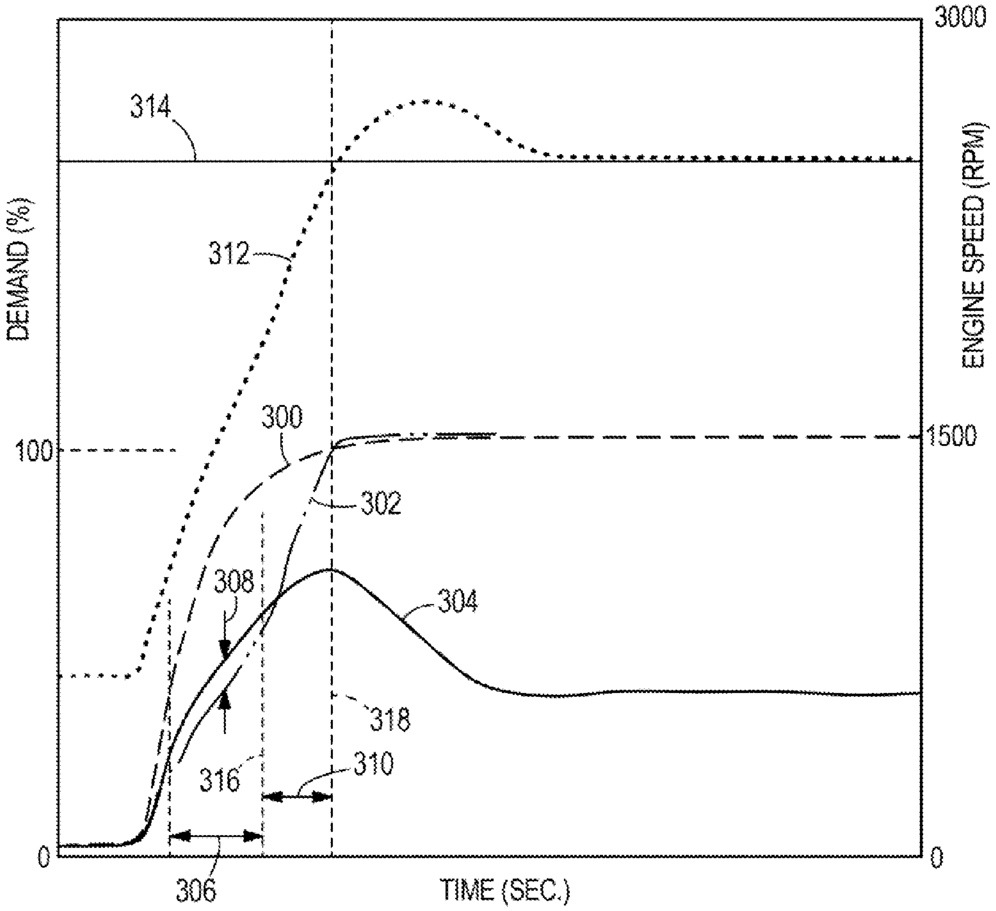
FIG. 7 is a graphical representation of one example of a result of carrying out the methods described herein.

Now with reference to FIG. 7, the result of carrying out the methods described hereinabove will be further detailed. The left hand axis of the graph shown in FIG. 7 represents the demand limit from 0 to 100%. The right hand axis represents the speed of the engine 62 in rotations per minute from 0 to 3000 RPM. The horizontal axis represents time in seconds. The curve 302 represents the smoke limit of the engine, as described hereinabove.

The curve 300 represents the second demand limit that is based on a user-selected acceleration profile, as described hereinabove with respect to FIGS. 1-4. The curve 304 represents the subsequent demand limit that is output by the control circuit 70 as a result of performing the methods described hereinabove with respect to FIGS. 5 and 6.

During the period of time represented by the arrow 306, the subsequent demand limit 304 is equal to the first demand limit. In other words, the subsequent demand limit 304 is equal to the smoke limit 302 plus a predetermined offset quantity. The predetermined offset quantity is shown by arrow 308. At this point, the turbocharger 64 has not yet spooled up and the first demand limit effectively controls the subsequent demand limit until the point in time represented by dashed line 316.

In contrast, during the period of time represented by arrow 310, the subsequent demand limit 304 is equal to the third demand limit. In other words, the subsequent demand limit 304 is rate limited according to the predetermined step quantity described hereinabove. This is because after the point in time represented by dashed line 316, the turbocharger 64 has spooled up and is able to provide adequate air flow to the engine 62 such that the smoke limit 302 increases dramatically. Rate limiting the subsequent demand limit 304 such that it may only increase by the predetermined step quantity as described hereinabove prevents the engine 62 from operating according to the very sharp rate of increase of the smoke limit curve 302 after dashed line 316 and therefore prevents undesired torque bump.

It should be noted that at least in this example, the second demand limit shown by curve 300 is at all times greater than the smoke limit 302 plus offset 308 (i.e., the first demand limit) and the third demand limit. Therefore, the subsequent demand limit 304 is never equal to the second demand limit 300 in this example. In other examples, there may be points in time when the second demand limit is less than the first or third demand limits and therefore determinative of the subsequent demand limit.

It can also be seen from FIG. 7 that the engine speed, represented by curve 312, increases at a relatively smooth rate toward an engine speed set point 314. At the point in time represented by dashed line 318, the engine speed 312 reaches the speed set point 314. At this same point in time 318, the control circuit 70 switches from the algorithm described herein above for limiting demand (see FIGS. 5-6 and accompanying description) to a proportional-integral-derivative (PID) algorithm for controlling the speed of the engine 62. An overshoot condition may be provided after the point in time at 318, as described hereinabove with respect to FIG. 2. The control circuit 70 thereafter controls the engine 62 so that the engine speed decreases toward the speed set point 314 and the vehicle thereafter cruises at the engine speed set point 314 according to PID control.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. A method for controlling acceleration of a vehicle having an internal combustion engine, the method comprising:

determining, with an engine control circuit, a first demand limit based on a smoke limit of the engine;

determining, with the engine control circuit, a second demand limit based on a user-selected acceleration profile;

retrieving a previous demand limit from a memory;

determining, with the engine control circuit, a third demand limit by adding a predetermined step quantity to the previous demand limit;

outputting the lesser of the first demand limit, the second demand limit, and the third demand limit as a subsequent demand limit; and controlling the engine with the engine control circuit to achieve the subsequent demand limit such that the vehicle accelerates from a speed associated with the previous demand limit to a speed associated with the subsequent demand limit.

2. The method of claim 1, further comprising storing the subsequent demand limit as the previous demand limit in the memory.

3. The method of claim 1, wherein the engine is a diesel engine.

4. The method of claim 3, further comprising determining the smoke limit based on at least one operating condition of the engine.

5. The method of claim 4, wherein the at least one operating condition is mass air flow in an intake manifold of the engine.

6. The method of claim 1, wherein the first demand limit is the smoke limit plus a predetermined offset quantity.

7. The method of claim 6, wherein the predetermined offset quantity is a percentage of the smoke limit.

8. The method of claim 7, wherein the predetermined offset quantity is between about 1% to about 5% of the smoke limit.

9. The method of claim 1, wherein the first demand limit, the second demand limit, and the third demand limit are torque limits.

10. The method of claim 1, wherein the first demand limit, the second demand limit, and the third demand limit are fuel quantity limits.

11. The method of claim 1, wherein the user-selected acceleration profile corresponds to a user-desired aggressiveness of acceleration of the vehicle.

12. The method of claim 1, wherein the vehicle is a marine vessel.

13. A system for controlling acceleration of a vehicle, the system comprising:

a propulsion device that provides a force to accelerate the vehicle;

an internal combustion engine connected in torque-transmitting relationship with the propulsion device;

one or more fuel injectors that provide fuel to the engine;

a control circuit connected to the one or more fuel injectors; and a memory that stores a previous demand limit of the engine;

wherein the control circuit determines a first demand limit based on a smoke limit of the engine, determines a second demand limit based on a user-selected acceleration profile, and determines a third demand limit by adding a predetermined step quantity to the previous demand limit;

wherein the control circuit sets the lesser of the first demand limit, the second demand limit, and the third demand limit as a subsequent demand limit; and wherein the control circuit sends control signals to the one or more fuel injectors so as to provide a quantity of fuel that will achieve the subsequent demand limit.

14. The system of claim 13, wherein the control circuit stores the subsequent demand limit as the previous demand limit in the memory.

15. The system of claim 13, wherein the engine is a diesel engine.

16. The system of claim 15, wherein the first demand limit is the smoke limit plus a predetermined offset quantity.

17. The system of claim 16, wherein the predetermined offset quantity is a percentage of the smoke limit.

18. The system of claim 17, wherein the predetermined offset quantity is between about 1% to about 5% of the smoke limit.

19. The system of claim 13, wherein the control circuit determines the first demand limit, the second demand limit, and the third demand limit at preselected time intervals.

20. The system of claim 13, wherein the predetermined step quantity varies depending on the user-selected acceleration profile.

* * * * *